(12) United States Patent
Lin et al.

(10) Patent No.: US 11,349,349 B2
(45) Date of Patent: May 31, 2022

(54) WIRELESS CHARGING METHOD, APPARATUS, SYSTEM, AND DEVICE TO BE CHARGED

(71) Applicant: Guangdong Oppo Mobile Telecommunications Corp., Ltd., Dongguan (CN)

(72) Inventors: Shangbo Lin, Guangdong (CN); Shiming Wan, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 204 days.

(21) Appl. No.: 16/575,100

(22) Filed: Sep. 18, 2019

(65) Prior Publication Data

US 2020/0014235 A1    Jan. 9, 2020

Related U.S. Application Data

(63) Continuation of application No. PCT/CN2018/081925, filed on Apr. 4, 2018.

(30) Foreign Application Priority Data

Apr. 7, 2017    (WO) ................ PCT/CN2017/079784

(51) Int. Cl.
*H02J 50/80*    (2016.01)
*H02J 50/10*    (2016.01)
(Continued)

(52) U.S. Cl.
CPC .............. *H02J 50/80* (2016.02); *H02J 5/005* (2013.01); *H02J 7/00* (2013.01); *H02J 7/0026* (2013.01);
(Continued)

(58) Field of Classification Search
CPC ....................................................... H02J 50/80
(Continued)

(56) References Cited

U.S. PATENT DOCUMENTS

| 8,400,105 B2 | 3/2013 | Kondo |
| 2012/0194124 A1 | 8/2012 | Toivola et al. |

(Continued)

FOREIGN PATENT DOCUMENTS

| CN | 102013717 A | 4/2011 |
| CN | 102130367 A | 7/2011 |

(Continued)

OTHER PUBLICATIONS

ISR with English translation for PCT application PCT/CN2018/081963.

(Continued)

*Primary Examiner* — Edward Tso
*Assistant Examiner* — Ahmed H Omar
(74) *Attorney, Agent, or Firm* — Young Basile Hanlon & MacFarlane, P.C.

(57) ABSTRACT

The present disclosure provides a wireless charging method, device, and system, and a device to be charged. The method includes: a wireless charging device receiving a request instruction sent by a device to be charged, the request instruction being configured to request the wireless charging device to provide a type of a power supply device to the device to be charged; the wireless charging device sending the type of power supply device identified by the wireless charging device to the device to be charged according to the request instruction. The type of power supply device including a fast charging type and a normal type, a maximum output power provided by the fast charging power supply device is greater than or equal to a preset value, and a (Continued)

500 when the wireless charging device is detected by the device to be charged, the device to be charged sends a request instruction to the wireless charging device, in which the request instruction is configured to instruct the wireless charging device to provide a type of a power supply device ~510 the device to be charged receives the type of the power supply device provided by the wireless charging device, the type of the power supply device including a fast charging type and a normal type, a maximum output power of a fast charging power supply device being greater than or equal to a preset value, and a maximum output power of a normal power supply device being less than the preset value ~520 the device to be charged enters a wireless charging mode matching the type of the power supply device for charging a battery of the device to be charged ~530 maximum output power provided by the normal power supply device is less than the preset value.

18 Claims, 6 Drawing Sheets

(51) Int. Cl.
    *H02J 7/00*         (2006.01)
    *H02M 3/07*       (2006.01)
    *H04B 5/00*        (2006.01)
    *H02J 5/00*        (2016.01)
    *H02J 50/12*      (2016.01)
    *H02J 7/02*        (2016.01)
    *H02J 7/04*        (2006.01)

(52) U.S. Cl.
    CPC ........ *H02J 7/0029* (2013.01); *H02J 7/00034* (2020.01); *H02J 7/0044* (2013.01); *H02J 7/00714* (2020.01); *H02J 7/025* (2013.01); *H02J 7/045* (2013.01); *H02J 50/10* (2016.02); *H02J 50/12* (2016.02); *H02M 3/07* (2013.01); *H04B 5/0037* (2013.01); *H04B 5/0075* (2013.01); *H02J 2207/20* (2020.01); *Y02B 40/00* (2013.01)

(58) Field of Classification Search
    USPC ......................................................... 320/108
    See application file for complete search history.

(56) References Cited

U.S. PATENT DOCUMENTS

| | | | |
|---|---|---|---|
| 2012/0300413 | A1 | 11/2012 | Iida |
| 2013/0002026 | A1 | 1/2013 | Mizutani et al. |
| 2013/0002202 | A1 | 1/2013 | Kuraishi |
| 2014/0247052 | A1 | 9/2014 | Hada |
| 2014/0327390 | A1 | 11/2014 | Park et al. |
| 2014/0329472 | A1 | 11/2014 | Kovacs et al. |
| 2015/0171658 | A1 | 6/2015 | Manova-Elssibony et al. |
| 2015/0180240 | A1 | 6/2015 | Kwon et al. |
| 2015/0244341 | A1 | 8/2015 | Ritter et al. |
| 2016/0036779 | A1* | 2/2016 | Collins ............... H04W 12/088 726/12 |
| 2016/0064959 | A1* | 3/2016 | Jung ....................... H02J 7/007 320/162 |
| 2016/0105038 | A1* | 4/2016 | Chi ..................... H02J 7/00036 320/107 |
| 2016/0268833 | A1* | 9/2016 | Lee ......................... H02J 7/025 |

FOREIGN PATENT DOCUMENTS

| | | |
|---|---|---|
| CN | 102522799 A | 6/2012 |
| CN | 103036282 A | 4/2013 |
| CN | 202998182 U | 6/2013 |
| CN | 103944243 A | 7/2014 |
| CN | 104113104 A | 10/2014 |
| CN | 104124483 A | 10/2014 |
| CN | 104283293 A | 1/2015 |
| CN | 104467130 A | 3/2015 |
| CN | 104600869 A | 5/2015 |
| CN | 104617632 A | 5/2015 |
| CN | 104752046 A | 7/2015 |
| CN | 105148402 A | 12/2015 |
| CN | 105226779 A | 1/2016 |
| CN | 105337384 A | 2/2016 |
| CN | 205355893 U | 6/2016 |
| CN | 105826066 A | 8/2016 |
| CN | 105896670 A | 8/2016 |
| CN | 205544421 U | 8/2016 |
| CN | 105978049 A | 9/2016 |
| CN | 106026231 A | 10/2016 |
| CN | 106026237 A | 10/2016 |
| CN | 106063073 A | 10/2016 |
| CN | 106169798 A | 11/2016 |
| CN | 106451705 A | 2/2017 |
| EP | 3068017 A2 | 9/2016 |
| JP | 2013085386 A | 5/2013 |
| TW | 201145753 A | 12/2011 |
| TW | I482391 B | 4/2015 |
| TW | 201533561 A | 9/2015 |
| TW | I552483 B | 10/2016 |
| WO | 2007015599 A1 | 2/2007 |

OTHER PUBLICATIONS

ISR with English translation for PCT application PCT/CN2018/081962.
ISR with English translation for PCT application PCT/CN2017/085990.
ISR with English translation for PCT application PCT/CN2017/079784.
OA with English translation for TW application 107112166.
OA with English translation for TW application 107112719.
ISR with English translation for PCT application PCT/CN2018/082013.
ISR for PCT application PCT/CN2017/080334.
ISR with English translation for PCT application PCT/CN2018/076722.
ISR with English translation for PCT application PCT/CN2018/081925.
ISR with English translation for PCT application PCT/CN2018/081909.
Extended EP Search Report for EP 18781530.3 dated Mar. 30, 2020.
English Translation Indian Office Action dated Jun. 23, 2020 from Application No. 201917038916.
English Translation Indian Office Action dated Jun. 7, 2020 from Application No. 201917039341.
European Office Action for European Application No. 18781325.8 dated Dec. 10, 2020.
European Office Action for European Application No. 18781530.3 dated Dec. 14, 2020.
Communication pursuant to Article 94(3) EPC for EP Application 18781325.8 dated Oct. 19, 2021. (5 pages).
Communication pursuant to Article 94(3) EPC for EP Application 18781530.3 dated Sep. 7, 2021. (5 pages).
Final Office Action for U.S. Appl. No. 16/579,602 dated Oct. 26, 2021. (22 pages).
Communication pursuant to Article 94(3) EPC for EP Application 18781325.8 dated May 17, 2021. (4 pages).
Communication pursuant to Article 94(3) EPC for EP Application 18781530.3 dated Apr. 28, 2021. (4 pages).
Non Final Office Action for U.S. Appl. No. 16/579,602 dated Apr. 28, 2021. (30 pages).

\* cited by examiner

WIRELESS CHARGING METHOD, APPARATUS, SYSTEM, AND DEVICE TO BE CHARGED

CROSS-REFERENCE TO RELATED APPLICATION(S)

The present application is a continuation of International Application No. PCT/CN2018/081925, filed on Apr. 4, 2018, which claims priority to International Application No. PCT/CN2017/079784, filed on Apr. 7, 2017, the disclosure of both of which are incorporated herein by reference in their entireties.

TECHNICAL FIELD

Embodiments of the present disclosure relate to a field of wireless charging technology, and more particularly, to a wireless charging method, a wireless charging device, a wireless charging system and a device to be charged.

BACKGROUND

At present, in the charging technology field, a device to be charged is typically charged in a wired charging mode.

Taking a mobile phone as an example, the mobile phone is typically charged in a wired charging mode. In detail, when there is a need to charge the mobile phone, the mobile phone may be coupled with a power supply device via a charging cable (for example, a USB (universal serial bus) cable), and an output power of the power supply device may be transmitted to the mobile phone via the charging cable, to charge a battery in the mobile phone.

Charging cables are required for charging the device to be charged in the wired charging mode, which results in cumbersome operations in a charging preparation stage. Thus, a wireless charging mode has been favored more and more by people.

SUMMARY

In a first aspect, a wireless charging method is provided. The method includes: a wireless charging device receiving a request instruction sent by a device to be charged, the request instruction being configured to request the wireless charging device to provide a type of a power supply device to the device to be charged; and the wireless charging device sending the type of the power supply device identified by the wireless charging device to the device to be charged according to the request instruction, the type of the power supply device including a fast charging type and a normal type, a maximum output power provided by a fast charging power supply device being greater than or equal to a preset value, and a maximum output power provided by a normal power supply device being less than the preset value.

In a second aspect, a wireless charging method is provided. The method includes: a device to be charged sending a request instruction to a wireless charging device when the wireless charging device is detected by the device to be charged, the request instruction being configured to instruct the wireless charging device to provide a type of a power supply device; the device to be charged receiving the type of the power supply device provided by the wireless charging device, the type of the power supply device including a fast charging type and a normal type, a maximum output power of a fast charging power supply device being greater than or equal to a preset value, and a maximum output power of a normal power supply device being less than the preset value; and the device to be charged entering a wireless charging mode matching the type of the power supply device for charging a battery of the device to be charged.

In a third aspect, a wireless charging device is provided. The wireless charging device includes: a communication control circuit, configured to receive a request instruction sent by a device to be charged, the request instruction being configured to request the wireless charging device to provide a type of a power supply device to the device to be charged; and to send the type of the power supply device identified by the wireless charging device to the device to be charged according to the request instruction, the type of the power supply device including a fast charging type and a normal type, a maximum output power provided by a fast charging power supply device being greater than or equal to a preset value, and a maximum output power provided by a normal power supply device being less than the preset value.

In a fourth aspect, a device to be charged is provided. The device to be charged includes: a battery; a communication control circuit, configured to send a request instruction to a wireless charging device, the request instruction being configured to instruct the wireless charging device to provide a type of a power supply device, and to receive the type of the power supply device coupled to the wireless charging device provided by the wireless charging device; the type of the power supply device including a fast charging type and a normal type, a maximum output power provided by a fast charging power supply device being greater than or equal to a preset value, and a maximum output power provided by a normal power supply device being less than the preset value; and a wireless receiver circuit, configured to receive an electromagnetic signal transmitted by the wireless charging device in a wireless charging mode matching the type of the power supply device, and to convert the electromagnetic signal to an output voltage and an output current of the wireless receiver circuit for charging the battery.

In a fifth aspect, a wireless charging system is provided. The wireless charging system includes a power supply device, the wireless charging device in the third aspect or in any possible implementation of the third aspect, and the device to be charged in the fourth aspect or in any possible implementation of the fourth aspect.

These and other aspects of the present disclosure will be more readily apparent from the following description of the embodiments.

DETAILED DESCRIPTION

The technical solutions in embodiments of the present disclosure will be clearly and completely described below with reference to the accompanying drawings in the embodiments.

The embodiments of the present disclosure are to charge a device to be charged based on wireless charging technologies, and the wireless charging technologies may complete power transmission without a cable, thereby simplifying the operations in the charging preparation phase.

Generally, in the conventional wireless charging technology, a power supply device (such as an adapter) is coupled to a wireless charging device (such as a wireless charging base), and the wireless charging device charges the device to be charged wirelessly by transmitting the output power of the power supply device to the device to be charged in a wireless manner (e.g., by electromagnetic signals or electromagnetic wave).

According to different wireless charging principles, the wireless charging mode may be subdivided into magnetic coupling (or electromagnetic induction), magnetic resonance, and radio waves. Presently, the mainstream wireless charging standards include a QI standard, a PMA (power matters alliance) standard, and an A4WP (alliance for wireless power) standard. The QI standard and the PMA standard perform wireless charging by magnetic coupling. The A4WP standard perform wireless charging by magnetic resonance.

The conventional wireless charging method is described below with reference to FIG. 1.

Figure 1:
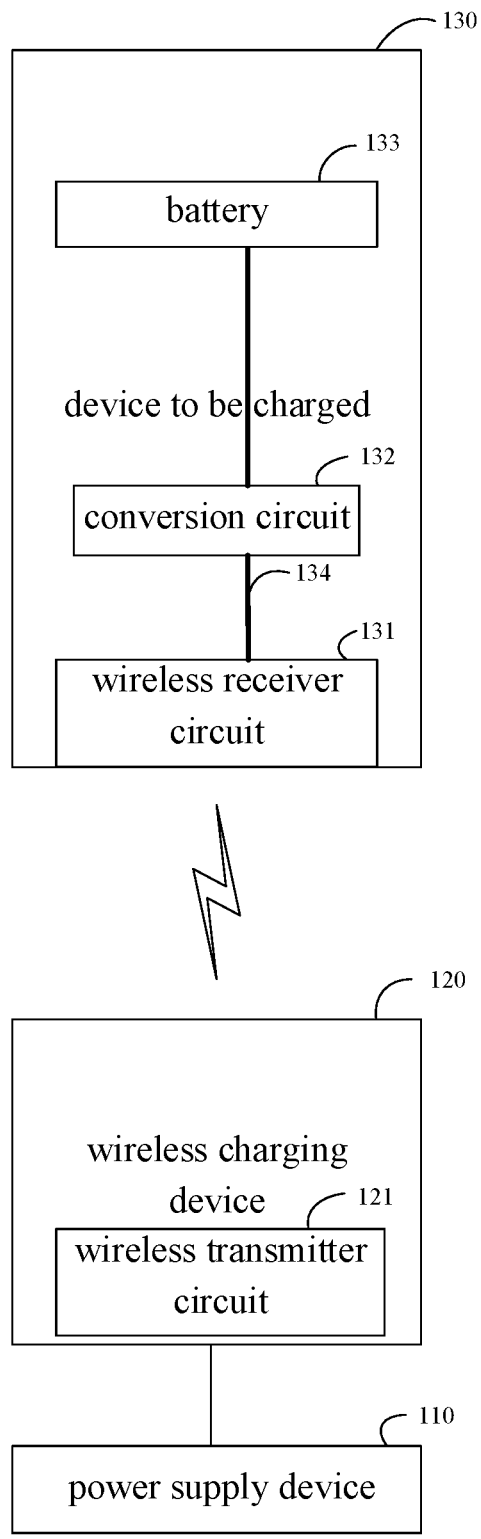
FIG. 1 is a block diagram of a conventional wireless charging system.

As illustrated in FIG. 1, the wireless charging system includes a power supply device 110, a wireless charging device 120, and a device to be charged 130. The power supply device 110 may be, for example, an adapter. The wireless charging device 120 may be, for example, a wireless charging base. The device to be charged 130 may be, for example, a terminal.

After the power supply device 110 is coupled to the wireless charging device 120, the output current of the power supply device 110 is transmitted to the wireless charging device 120. The wireless charging device 120 may convert the output current of the power supply device 110 into electromagnetic signals (or electromagnetic wave) by the internal wireless transmitter circuit 121. For example, the wireless transmitter circuit 121 may convert the output current of the power supply device 110 into alternating current, and convert the alternating current into electromagnetic signals through a transmitting coil or a transmitting antenna (not shown).

The device to be charged 130 may receive the electromagnetic signals transmitted by the wireless transmitter circuit 121 through the internal wireless receiver circuit 131 and convert the electromagnetic signals into the output current of the wireless receiver circuit 131. For example, the wireless receiver circuit 131 may convert electromagnetic signals transmitted by the wireless transmitter circuit 121 into alternating current through a receiving coil or a receiving antenna (not shown), and perform rectification and/or filtering operations on the alternating current to convert the alternating current into an output voltage and an output current of the wireless receiver circuit 131.

In the conventional wireless charging technology, the wireless charging device 120 and the device to be charged 130 pre-negotiate the transmitting power of the wireless transmitter circuit 121 before wireless charging. Assuming that the power negotiated between the wireless charging device 120 and the device to be charged 130 is 5 W, the output voltage and output current of the wireless receiver circuit 131 are generally 5 V and 1 A. Assuming that the power negotiated between the wireless charging device 120 and the device to be charged 130 is 10.8 W, the output voltage and output current of the wireless receiver circuit 131 are generally 9 V and 1.2 A.

The output voltage of the wireless receiver circuit 131 is not suitable for being directly applied to both ends of the battery 133, but needs to be converted by a conversion circuit 132 in the device to be charged 130 to obtain the charging voltage and/or charging current expected by the battery in the device to be charged 130. Specifically, a first charging channel 134 in the device to be charged 130 may input the output voltage and output current of the wireless receiver circuit 131 into the conversion circuit 132, and the output voltage and output current converted by the conversion circuit 132 may be applied to both ends of the battery 133 through the first charging channel 134, to meet requirements of the charging voltage and/or charging current expected by the battery 133.

As an example, the conversion circuit 132 may refer to a charging management module, for example a charging integrated circuit (IC). The conversion circuit 132 is configured to manage the charging voltage and/or charging current of the battery 133 during charging of the battery 133. The conversion circuit 132 may have a voltage feedback function, and/or a current feedback function to enable management of the charging voltage and/or charging current of the battery 133.

For example, the charging process of the battery may include one or more of a trickle charging stage, a constant current charging stage, and a constant voltage charging stage. In the trickle charging stage, the conversion circuit 132 may utilize the current feedback function to ensure that a current flowing into the battery 133 in the trickle charging stage meets the charging current (such as a first charging current) expected by the battery 133. In the constant current charging stage, the conversion circuit 132 may utilize a current feedback loop to ensure that the current flowing into the battery 133 in the constant current charging stage meets the charging current (such as a second charging current, which may be greater than the first charging current) expected by the battery 133. In the constant voltage charging stage, the conversion circuit 132 may utilize a voltage feedback loop to ensure that a voltage applied to both ends of the battery 133 in the constant voltage charging stage meets the charging voltage expected by the battery 133.

As an example, when the output voltage of the wireless receiver circuit 131 is greater than the charging voltage expected by the battery 133, the conversion circuit 132 may be configured to perform a step-down process on the output voltage of the wireless receiver circuit 131, to enable the charging voltage obtained after the step-down conversion satisfies the requirements of the charging voltage expected by the battery 133. As still another example, when the output voltage of the wireless receiver circuit 131 is less than the charging voltage expected by the battery 133, the conversion circuit 132 may be configured to perform a boost process on the output voltage of the wireless receiver circuit 131, to enable the charging voltage obtained after the boost conversion satisfies the requirements of the charging voltage expected by the battery 133.

As another example, assume that the wireless receiver circuit 131 outputs a constant voltage of 5V. When the battery 133 includes a single battery cell (such as a lithium battery cell, a charging cut-off voltage of a single battery cell is typically 4.2V), the conversion circuit 132 (for example, a buck circuit) may perform a buck conversion on the output voltage of the wireless receiver circuit 131, such that the charging voltage obtained after the buck conversion meets a requirement of the charging voltage expected by the battery 133.

As another example, assume that the wireless receiver circuit 131 outputs a constant voltage of 5V. When the battery 133 includes two or more battery cells (such as lithium battery cell, a charging cut-off voltage of a single battery cell is typically 4.2V) coupled in series, the conversion circuit 132 (for example, a boost circuit) may perform a boost conversion on the output voltage of the wireless receiver circuit 131, such that the charging voltage obtained after the boost conversion meets a requirement of the charging voltage expected by the battery 133.

Limited by a poor conversion efficiency of the conversion circuit 132, a part of electric energy is lost in a form of heat, and the heat may gather inside the device to be charged 130. A design space and a space for heat dissipation of the device to be charged 130 are small (for example, the physical size of a mobile terminal used by a user becomes thinner and thinner, while plenty of electronic elements are densely arranged in the mobile terminal to improve performance of the mobile terminal), which not only increases difficulty in designing the conversion circuit 132, but also results in that it is hard to dissipate the heat gathered in the device to be charged 130 in time, thus further causing an abnormity of the device to be charged 130.

For example, the heat gathered on the conversion circuit 132 may cause a thermal interference on electronic elements neighboring the conversion circuit 132, thus causing abnormal operations of the electronic elements. For another example, the heat gathered on the conversion circuit 132 may shorten the service life of the conversion circuit 132 and neighboring electronic elements. For yet another example, the heat gathered on the conversion circuit 132 may cause a thermal interference on the battery 133, thus causing abnormal charging and/or abnormal discharging of the battery 133. For still another example, the heat gathered on the conversion circuit 132 may increase the temperature of the device to be charged 130, thus affecting user experience during the charging. For still yet another example, the heat gathered on the conversion circuit 132 may short-circuit the conversion circuit 132, such that the output voltage of the wireless receiver circuit 131 is directly applied to both ends of the battery 133, thus causing abnormal charging of the battery 133, which brings safety hazard if the over-voltage charging lasts for a long time, for example, the battery 133 may explode.

In order to solve the above problem, embodiments of the present disclosure provide a wireless charging system different from the conventional wireless charging system. The wireless charging device and the device to be charged in the wireless charging system can perform wireless communication with each other, and the transmitting power of the wireless charging device can be adjusted based on feedback information of the device to be charged, such that the transmitting power of the wireless charging device matches the charging voltage and/or charging current presently required the battery in the device to be charged (or matches a present charging stage of the battery in the device to be charged). The transmitting power of the wireless charging device matching the charging voltage and/or the charging current presently required by the battery refers to that the transmitting power of the electromagnetic signal is configured by the wireless charging device such that, after the electromagnetic signal is received by the wireless receiver circuit, the output voltage and/or the output current of the wireless receiver circuit match the charging voltage and/or charging current presently required by the battery in the device to be charged (or the output voltage and/or output current of the wireless receiver circuit meet the charging requirement of the battery in the device to be charged). In this way, in the device to be charged, the output voltage and/or the output current of the wireless receiver circuit can be directly applied to both ends of the battery to charge the battery (hereinafter, this charging method of the device to be charged is referred to as direct charging), thus avoiding the above-mentioned problems such as energy loss and heating caused by the conversion circuit converting the output voltage and/or the output current of the wireless receiver circuit.

The wireless charging mode of direct charging is described below with reference to FIG. 2.

Figure 2:
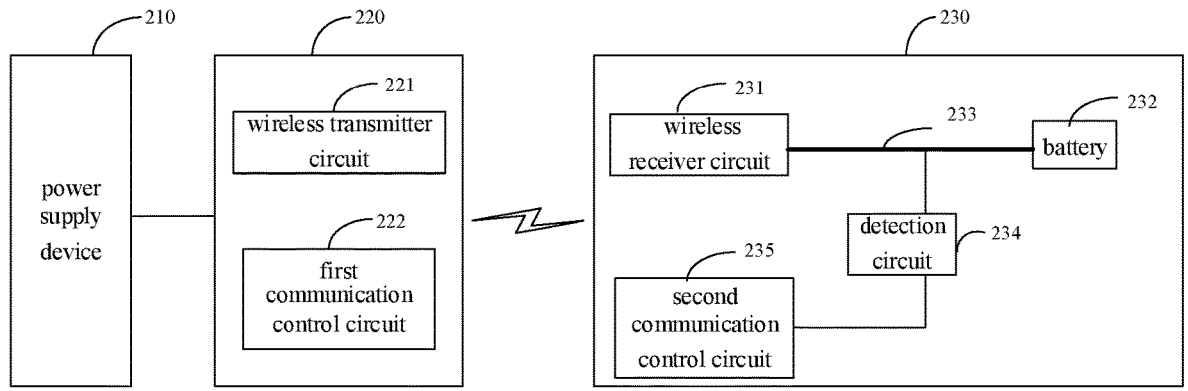
FIG. 2 is a block diagram of a direct-charging wireless charging system.

As illustrated in FIG. 2, the wireless charging system includes a power supply device 210, a wireless charging device 220, and a device to be charged 230. The power supply device 210 may be, for example, an adapter. The wireless charging device 220 may be, for example, a wireless charging base. The device to be charged 230 may be, for example, a terminal.

The wireless charging device 220 may include a wireless transmitter circuit 221 and a first communication control circuit 222. The control function of the first communication control circuit 222 may be implemented, for example, by a micro control unit (MCU).

After the power supply device 210 is coupled to the wireless charging device 220, the output current of the power supply device 210 is transmitted to the wireless charging device 220. The wireless charging device 220 may convert the output current of the power supply device 210 into electromagnetic signals (or electromagnetic wave) by an internal wireless transmitter circuit 221 for transmitting. For example, the wireless transmitter circuit 221 may convert the output current of the power supply device 210 into alternating current, and convert the alternating current into electromagnetic signals through a transmitting coil or a transmitting antenna (not shown).

The first communication control circuit 222 may be configured to perform wireless communication with the device to be charged 230 during wireless charging. Specifically, the first communication control circuit 222 may communicate with a second communication control circuit 235 in the device to be charged 230. The communication manner between the first communication control circuit 222 and the second communication control circuit 235, and the communication information exchanged between the first communication control circuit 222 and the second communication control circuit 235 are not specifically limited in the embodiments of the present disclosure, and the detailed description will be made below in combination with specific embodiments.

The device to be charged 230 may include a wireless receiver circuit 231, a battery 232, a second charging channel 233, a detection circuit 234, and a second communication control circuit 235. The control function of the second communication control circuit 235 may be implemented, for example, by a micro control unit (MCU), or by an MCU together with an application processor (AP) inside the device to be charged.

The device to be charged 230 may receive the electromagnetic signals transmitted by the wireless transmitter circuit 221 through the internal wireless receiver circuit 231, and convert the electromagnetic signals into the output current of the wireless receiver circuit 231. For example, the wireless receiver circuit 231 may convert the electromagnetic signals transmitted by the wireless transmitter circuit 221 into an alternating current through a receiving coil or a receiving antenna (not shown), and perform operations such as rectification and/or filtering on the alternating current to convert the alternating current into an output voltage and an output current of the wireless receiver circuit 231. The detection circuit 234 may be configured to detect the output voltage and/or output current of the wireless receiver circuit 231. It should be noted that, the specific form of the shaping circuit and the form of the output voltage and the output current of the wireless receiver circuit 231 obtained after shaping of the shaping circuit are not specifically limited in the embodiments of the present disclosure. In some embodiments, the shaping circuit may include a rectification circuit and a filtering circuit, and the output voltage of the wireless receiver circuit 231 may be a stable voltage obtained after filtering. In other embodiments, the shaping circuit may include a rectification circuit, and the output voltage of the wireless receiver circuit 231 may be a voltage with a pulsating waveform obtained after rectification, which is directly applied to both ends of the battery 232 in the device to be charged 230 to charge the battery 232. It may be understood that the output current of the wireless receiver circuit 231 may charge the battery 232 intermittently, and a period of the output current of the wireless receiver circuit 231 may vary with a frequency of the alternating current entering the wireless charging system 200 (for example, a frequency of the alternating current power grid). For example, the frequency corresponding to the period of the output current of the wireless receiver circuit 231 may be an integer multiple or a reciprocal multiple of the frequency of the power grid. Moreover, when the output current of the wireless receiver circuit 231 may charge the battery 232 intermittently, the current waveform corresponding to the output current of the wireless receiver circuit 231 may consist of one pulse or a group of pulses synchronized with the power grid. A magnitude of the voltage/current with the pulsating form changes periodically, which, compared to the conventional constant direct current, may reduce lithium precipitation of a lithium battery, and prolong a service life of the battery, and moreover may be beneficial to reduce polarization effect of the battery, improve a charging speed, and reduce heating of the battery, thus ensuring safety and reliability of charging the device to be charged.

The second charging channel 233 may be configured to receive the output voltage and the output current of the wireless receiver circuit 231, and charge the battery 232 based on the output voltage and the output current of the wireless receiver circuit 231. The second charging channel 233 may perform direct charging on the battery 232 based on the output voltage and output current of the wireless receiver circuit 231. For example, the second charging channel 233 may be a wire. For another example, in a case where the device to be charged 230 includes a plurality of charging channels, an element such as a switch may be disposed on the second charging channel 233 for switching between different charging channels.

The detection circuit 234 may be configured to detect the output voltage and/or output current of the wireless receiver circuit 231. In some embodiments, the detection circuit 234 may include a voltage detection circuit and a current detection circuit.

The voltage detection circuit may be configured to sample the output voltage of the wireless receiver circuit 231 and transmit the sampled voltage value to the second communication control circuit 235. In some embodiments, the voltage detection circuit may sample the output voltage of the wireless receiver circuit 231 by means of voltage division using a series circuit.

The current detection circuit may be configured to sample the output current of the wireless receiver circuit 231 and transmit the sampled current value to the second communication control circuit 235. In some embodiments, the current detection circuit may sample the output current of the wireless receiver circuit 231 via a current detection resistor and a galvanometer.

The second communication control circuit 235 may be configured to perform wireless communication with the first communication control circuit 222 according to the output voltage and/or the output current of the wireless receiver circuit 231 detected by the detection circuit 234, so that the first communication control circuit 222 adjusts the transmitting power of the wireless transmitter circuit 221, to ensure that the output voltage and/or output current of the wireless receiver circuit can be directly applied to both ends of the battery 232.

Presently, the conventional wireless charging technology is limited to the standard wireless charging mode. In other words, the wireless charging device may charge the device to be charged merely in the wireless charging mode as illustrated in FIG. 1, which is onefold.

Therefore, the embodiments of the present disclosure provide a wireless charging method, in which wireless charging mode, the wireless charging device may provide the type of the power supply device to the device to be charged according to the request of the device to be charged, such that the device to be charged may enter the corresponding wireless charging mode according to the type of the power supply device, making the wireless charging more flexible and improving the user experience.

Figure 3:
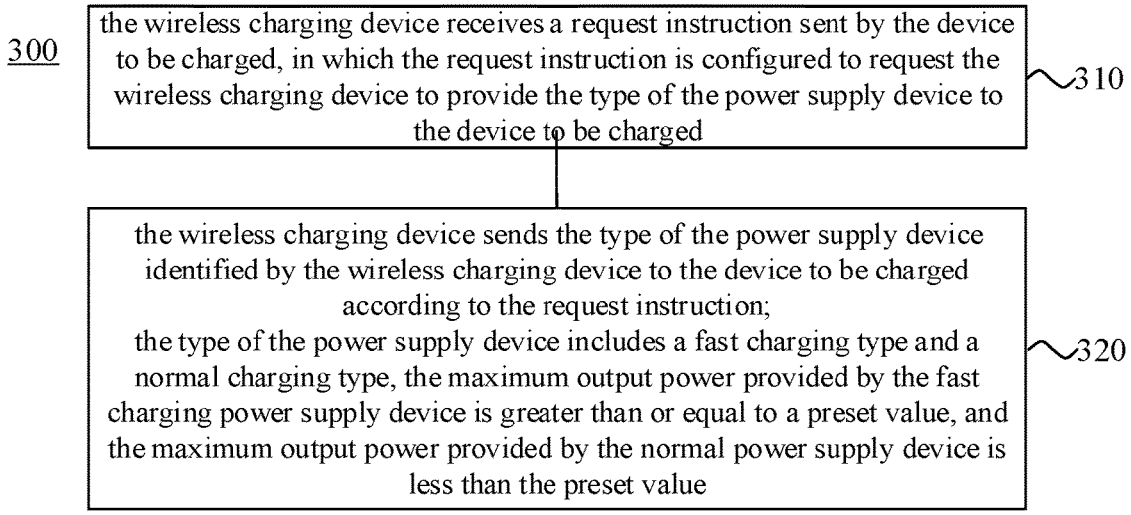
FIG. 3 is a flowchart of a wireless charging method according to an embodiment of the present disclosure.

A wireless charging method 300 provided by an embodiment of the present disclosure is described below with reference to FIG. 3. As illustrated in FIG. 3, the method 300 may be implemented by a wireless charging device (such as the wireless charging device 220 of FIG. 2). The wireless charging device may be, for example, a wireless charging base, and the method 300 may include some or all of the following contents.

At S310, the wireless charging device receives a request instruction sent by the device to be charged, in which the request instruction is configured to request the wireless charging device to provide the type of the power supply device to the device to be charged.

At S320, the wireless charging device sends the type of the power supply device identified by the wireless charging device to the device to be charged according to the request instruction.

The type of the power supply device includes a fast charging type and a normal charging type. The maximum output power provided by the fast charging power supply device is greater than or equal to a preset value, and the maximum output power provided by the normal power supply device is less than the preset value.

It should be noted that, the fast charging power supply device may refer to a power supply device that provides the maximum output power greater than or equal to the preset value, and the normal power supply device may refer to a power supply device that provides the maximum output power that is less than the preset value. It should be understood that in embodiments of the present disclosure, fast charging and normal charging are merely classified according to the maximum output power, and no other characteristics of the power supply device are distinguished. In other words, "fast charging power supply device" and "normal charging power supply device" may be equivalent to "first type power supply device" and "second type power supply device". For example, a power supply device having a maximum output power greater than or equal to 20 W may be classified as a fast charging power supply device, and a power supply device having a maximum output power less than 20 W may be classified as a normal power supply device.

In embodiments of the present disclosure, the wireless charging device may provide the type of the power supply device to the device to be charged according to the request of the device to be charged, such that the device to be charged may enter the wireless charging mode matching the type of the power supply device provided by the wireless charging device.

In some embodiments, the wireless charging device may also enter the corresponding wireless charging mode according to the type of the power supply device. For example, when the power supply device is the fast charging power supply device, the wireless charging device charges the battery of the device to be charged in the first wireless charging mode; and when the power supply device is the normal power supply device, the wireless charging device charges the battery of the device to be charged in the second wireless charging mode. The charging speed at which the wireless charging device charges the battery in the first wireless charging mode is greater than the charging speed at which the wireless charging device charges the battery in the second wireless charging mode. In other words, compared to the wireless charging device operating in the second wireless charging mode, it takes less time for the wireless charging device operating in the first wireless charging mode to charge the battery with the same capacity in the device to be charged.

The second wireless charging mode may be referred to as a normal wireless charging mode. The first wireless charging mode may be a fast wireless charging mode. The normal wireless charging mode may refer to a wireless charging mode in which the transmitting power (or output power) of the wireless charging device is relatively small and the output power is fixed (usually less than 15 W, and the commonly used transmitting power is 5 W or 10 W). In the normal wireless charging mode, it may take several hours to fully charge a larger capacity battery (such as a battery with 3000 mAh). In contrast, the fast wireless charging mode may refer to a wireless charging mode in which the transmitting power (or output power) of the wireless charging device is relatively higher and the output power is adjustable (usually greater than 15 W). Compared to the normal wireless charging mode, the charging speed of the wireless charging device in the fast wireless charging mode is faster, and the charging time required for fully charging a battery with a same capacity in the fast wireless charging mode may be significantly shortened.

It should be understood that, in some embodiments, the fixed output power does not necessarily mean that the output power remains completely unchanged, instead, the fixed output power may vary within a certain range, for example, the output power fluctuates by 0.5 W either way of 10 W.

Figure 4:
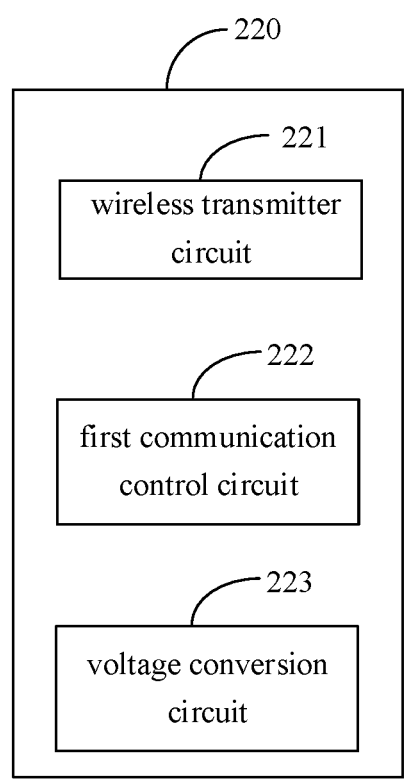
FIG. 4 is a block diagram of a wireless charging device according to an embodiment of the present disclosure.

In an embodiment of the present disclosure, as illustrated in FIG. 4, the wireless charging device 220 may further include a voltage conversion circuit 223. The voltage conversion circuit 223 is configured to perform voltage conversion on the current provided to the wireless transmitter circuit 221 when the voltage of the current provided to the wireless transmitter circuit 221 fails to meet the preset condition. As previously mentioned, in an embodiment, the current provided to the wireless transmitter circuit 221 may be provided by the power supply device.

Of course, in some embodiments, if the voltage supplied to the wireless transmitter circuit 221 may reach the voltage requirement of the wireless transmitter circuit 221 for the input voltage, the voltage conversion circuit may be omitted to simplify the implementation of the wireless charging device. The voltage requirement of the wireless transmitter circuit 221 for the input voltage may be set according to practical needs, for example, may be set to 10V.

In an embodiment of the present disclosure, the voltage corresponding to the current provided to the wireless transmitter circuit 221 failing to meet the preset condition may mean that, the voltage is less than the voltage required by the wireless transmitter circuit, or the voltage is higher than the voltage required by the wireless transmitter circuit 221. For example, when the wireless charging device 220 identifies that the power supply device is a normal power supply device, and when the wireless charging device 220 performs wireless charging on the device to be charged in the first wireless charging mode, since the first wireless charging mode requires a higher input voltage (e.g., 10V or 20V) of the wireless transmitter circuit 221, and the voltage provided by a normal power supply device to the wireless transmitter circuit 221 cannot meet the voltage requirement of the wireless transmitter circuit 221, i.e., cannot meet the voltage requirement of the device to be charged, the voltage conversion circuit 223 may perform boost process on the input voltage, to make the voltage after the boost process satisfy the voltage requirement of the wireless transmitter circuit 221. On the contrary, when the wireless charging device 220 identifies that the power supply device is a fast charging power supply device, and when the wireless charging device 220 performs wireless charging on the device to be charged in the second wireless charging mode, since the second wireless charging mode requires a relatively low input voltage of the wireless transmitter circuit 221, and the voltage provided by the fast charging power supply device to the wireless transmitter circuit 221 exceeds the voltage requirement of the wireless transmitter circuit 221, the voltage conversion circuit 223 may perform step-down process on the input voltage to make the voltage after the step-down process satisfy the voltage requirement of the wireless transmitter circuit 221.

Therefore, with the voltage conversion circuit, when the power supply device is the normal power supply device, the device to be charged may still be charged in the first wireless charging mode; or, with the voltage conversion circuit, when the power supply device is the fast charging power supply device, the device to be charged may still be charged in the second wireless charging mode, which not only improves the charging speed, but also improves the compatibility of the wireless charging device.

Figure 5:
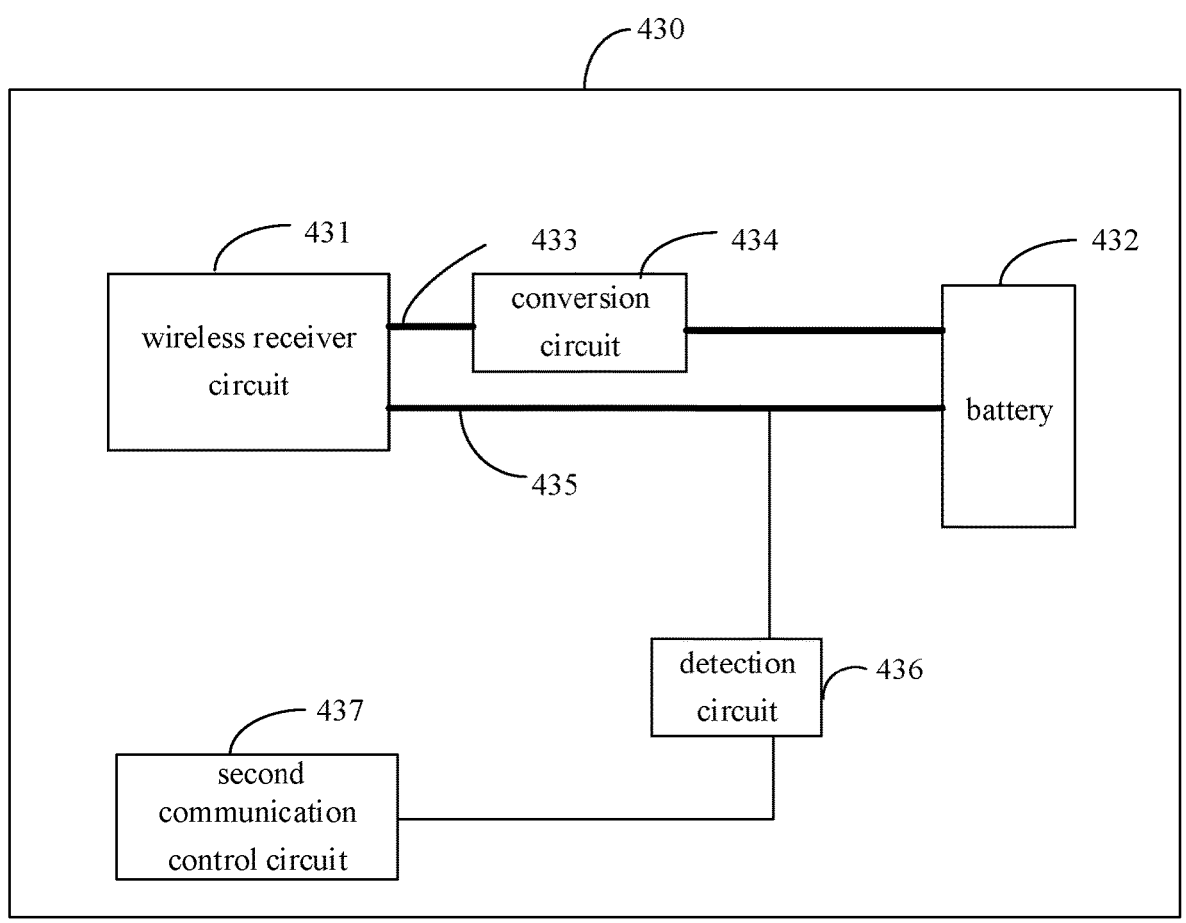
FIG. 5 is a block diagram of a device to be charged according to an embodiment of the present disclosure.

In another embodiment of the present disclosure, both the wireless charging device and the device to be charged may support the first wireless charging mode and the second wireless charging mode, and the first wireless charging mode and the second wireless charging mode may correspond to different charging circuits in the device to be charged. Specifically, it may be described in combination with FIG. 5. As illustrated in FIG. 5, the device to be charged 430 includes a wireless receiver circuit 431, a battery 432, a first charging channel 433, a conversion circuit 434, a second charging channel 435, a detection circuit 436, and a second communication control circuit 437. In the first wireless charging mode, the device to be charged may directly apply the output voltage and output current of the wireless receiver circuit 431 to both ends of the battery 432 through the second charging channel 435 (the working principle of which is similar to that in FIG. 2).

In an embodiment, a step-down circuit may be disposed on the second charging channel 435.

The step-down circuit is configured to perform step-down process on the direct current output by the wireless receiver circuit 431 to obtain an output voltage and an output current of the second charging channel 435. In an embodiment, the voltage value and current value of the direct current outputted by the wireless receiver circuit 431 conform to the charging requirement of the battery, the step-down circuit may be omitted, and the wireless receiver circuit 531 is directly coupled to the battery 432, which simplifies implementation of the device to be charged. In embodiments of the present disclosure, the implementation of the step-down circuit may be various. As an example, the step-down circuit may be a Buck circuit. As another example, the step-down circuit may be a charge pump. The charge pump may be composed of a plurality of switching elements. The heat generated by the current flowing through the switching elements is very small, which is almost equivalent to the heat generated by the current directly passing through the wire. Therefore, the charge pump is used as the step-down circuit, which not only reduces the voltage, but also has low heat generation. As another example, the step-down circuit may also be a half voltage circuit.

In an embodiment, the boosting factor of the voltage conversion circuit of the wireless charging device 220 and the step-down factor of the step-down circuit of the device to be charged 430 may be set according to the parameters such as the output voltage that can be provided by the power supply device and the charging voltage required by the battery. The boosting factor and the step-down factor may be equal to each other or not, which is not specifically limited in the embodiments of the present disclosure.

As an example, the boosting factor of the voltage conversion circuit may be set equal to the step-down factor of the step-down circuit. For example, the voltage conversion circuit may be a voltage doubling circuit for boosting the output voltage of the power supply device by a factor of two; and the step-down circuit may be a half voltage circuit for reducing the output voltage of the wireless receiver circuit by half. Therefore, the voltage difference between the input voltage and the output voltage of the half voltage circuit is fixed, which may reduce the heat generation of the half voltage circuit and improve the conversion efficiency.

In the second wireless charging mode, the device to be charged may input the output voltage and output current of the wireless receiver circuit 431 to the conversion circuit 434 through the first charging channel 433, and apply the converted output voltage and output current to both ends of the battery 432 through the first charging channel 433 (the working principle of which is same as that in FIG. 1). In some embodiments, the wireless charging device may identify the type of the power supply device before receiving the request instruction sent by the device to be charged, and sends the type of the power supply device to the device to be charged after receiving the request instruction. For example, once the wireless charging device is coupled to the power supply device, the wireless charging device identifies the type of the power supply device. Then, after receiving the request instruction, the wireless charging device sends the type of the power supply device to the device to be charged.

In other embodiments, the wireless charging device may identify the type of the power supply device after receiving the request instruction of the device to be charged, and further sends the type of the power supply device to the device to be charged. In other words, the wireless charging device identifies and sends the type of the power supply device under the trigger of the request instruction.

In some embodiments, in the first wireless charging mode, the power of the electromagnetic signal transmitted by the wireless charging device matches the charging voltage and/or charging current presently required by the battery in the device to be charged.

After the wireless charging device enters the first wireless charging mode for charging the device to be charged, the wireless charging device may further perform wireless communication with the device to be charged to adjust the transmitting power of the wireless transmitter circuit. In other words, the transmitting power of the wireless charging device may be adjusted based on feedback information of the device to be charged. The device to be charged may detect whether the charging voltage and the charging current applied to both ends of the battery matches the present charging stage of the battery in real time through the internal detection circuit. If the charging voltage and the charging current applied to both ends of the battery does not match the present charging stage of the battery, the device to be charged may provide feedback to the wireless charging device, for example, may provide the feedback about the mis-match of the charging voltage and/or the mis-match of the charging current.

As an example, the device to be charged may send adjustment information to the wireless charging device, to instruct the wireless charging device to adjust the transmitting power of the wireless transmitter circuit. For example, the adjustment information may instruct the wireless charging device to increase the transmitting power of the wireless transmitter circuit. For another example, the adjustment information may instruct the wireless charging device to decrease the transmitting power of the wireless transmitter circuit. More specifically, the wireless charging device may set a plurality of levels for the transmitting power of the wireless transmitter circuit. Every time when the wireless charging device receives the adjustment information, it adjusts the transmitting power of the wireless transmitter circuit 221 by one level until the output voltage and/or the output current of the wireless receiver circuit in the device to be charged match the charging voltage and/or the charging current presently required by the battery 232.

In addition to the above communication content, other communication information may be communicated between the wireless charging device and the device to be charged. In some embodiments, information used for safety protection, abnormality detection or failure processing, for example, temperature information of the battery 232, information indicating entering overvoltage protection or overcurrent protection, and power transmission efficiency information (the power transmission efficiency information may be configured to indicate a power transmission efficiency between the wireless transmitter circuit and the wireless receiver circuit), may be communicated between the wireless charging device and the device to be charged.

For example, when the temperature of the battery is too high, the wireless charging device and/or the device to be charged may control the charging loop to enter a protection state, for example, control the charging loop to stop wireless charging. For another example, after the wireless charging device receives the indication information indicating overvoltage protection or overcurrent protection sent by the device to be charged, the wireless charging device may reduce the transmitting power or stop working. For another example, after the wireless charging device receives the power transmission efficiency information sent by the device to be charged, if the power transmission efficiency is less than a preset threshold, the wireless charging device is controlled to stop working, and the user is informed of the event by, for example, displaying information indicating that the power transmission efficiency is too low through the display, or indicating that the power transmission efficiency is too low through the indicator light, such that the user may adjust the wireless charging environment.

In embodiments of the present disclosure, the wireless communication mode between the wireless charging device and the device to be charged is not limited. For example, the wireless charging device and the device to be charged may perform the wireless communication based on Bluetooth, Wi-Fi (wireless fidelity) or backscatter modulation (or power load modulation).

The charging process of the battery may include at least one of a trickle charging stage, a constant current charging stage, and a constant voltage charging stage.

For example, in the trickle charging stage of the battery, the power of the electromagnetic signals transmitted by the wireless charging device matches the charging current corresponding to the trickle charging stage. In other words, during the trickle charging stage of the battery, the wireless charging device adjusts the transmitting power of the wireless transmitter circuit, such that the output current of the wireless receiver circuit matches the charging current corresponding to the trickle charging stage (or, such that the output current of the wireless receiver circuit satisfies a requirement of the charging current of the battery during the trickle charging stage).

Take the charging current corresponding to the trickle charging stage being 1 A as an example. When the battery is in the trickle charging stage, the device to be charged may detect the output current of the wireless receiver circuit in real time. When the output current of the wireless receiver circuit is greater than 1 A, the device to be charged may communicate with the wireless charging device, such that the wireless charging device adjusts the transmitting power of the wireless transmitter circuit, to enable the output current of the wireless receiver circuit to return back to 1 A.

For example, in the constant voltage charging stage of the battery, the power of the electromagnetic signal transmitted by the wireless charging device matches the charging voltage corresponding to the constant voltage charging stage. In other words, in the constant voltage charging stage of the battery, the wireless charging device adjusts the transmitting power of the wireless transmitter circuit, such that the output voltage of the wireless receiver circuit matches the charging voltage corresponding to the constant voltage charging stage (or, such that the output voltage of the wireless receiver circuit satisfies the requirement of the charging voltage of the battery during the constant voltage charging stage).

Take the charging voltage corresponding to the constant voltage charging stage being 5V as an example. When the battery is in the constant voltage charging stage, the device to be charged may detect the output voltage of the wireless receiver circuit in real time. When the output voltage of the wireless receiver circuit is less than 5V, the device to be charged may perform wireless communication with the wireless charging device, so that the wireless charging device adjusts the transmitting power of the wireless transmitter circuit, to make the output voltage of the wireless receiver circuit return to 5V.

For example, in the constant current charging stage of the battery, the power of the electromagnetic signal transmitted by the wireless charging device matches the charging current corresponding to the constant current charging stage. In other words, in the constant current charging stage of the battery, the wireless charging device adjusts the transmitting power of the wireless transmitter circuit, such that the output current of the wireless receiver circuit matches the charging current corresponding to the constant current charging stage (or, such that the output current of the wireless receiver circuit satisfies the requirement of the charging current of the battery during the constant current charging stage).

Take the charging current corresponding to the constant current charging stage being 2 A as an example. When the battery is in the constant current charging stage, the device to be charged may detect the output current of the wireless receiver circuit in real time. When the output current of the wireless receiver circuit is less than 2 A, the device to be charged may perform wireless communication with the wireless charging device, so that the wireless charging device adjusts the transmitting power of the wireless transmitter circuit, to make the output current of the wireless receiver circuit return to 2 A.

There may be various reasons resulting in change of the output current of the wireless receiver circuit, which will not be limited in embodiments of the present disclosure. For example, when transmission of the electromagnetic signal between the wireless transmitter circuit and the wireless receiver circuit is interfered, the energy conversion efficiency is reduced, thus resulting in that the output current of the wireless receiver circuit is less than 2 A.

It should be noted that, it is not necessary to keep the charging current completely constant during the constant current charging stage or the constant current stage involved in embodiments of the present disclosure. For example, it may refer to in general that, a peak value or a mean value of the charging current keeps constant in a certain time period. In practice, a multi-stage constant current mode is typically adopted for charging in the constant current charging stage.

The multi-stage constant current charging may include N constant current stages, where N is an integer no less than 2. The first charging stage of the multi-stage constant current charging starts with a predetermined charging current. N constant current stages in the multi-stage constant current charging are performed in sequence from the first charging stage to the $N^{th}$ charging stage. After the constant current charging is switched from one constant current stage to the next constant current stage, the peak value or mean value of the current with the pulsating waveform may be decreased. When the battery voltage reaches a charging stop voltage threshold, the constant current charging is switched from the present constant current stage to the next constant current stage. The current change between two adjacent constant current stages may be gradual, or may be in a stepped skip manner.

It should be understood that, the device to be charged used in embodiments of the present disclosure may refer to the "terminal". The "terminal" may include, but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of a mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver. In addition, the device to be charged or terminal used in embodiments of the present disclosure may further include a power bank. The power bank may receive charging from the wireless charging device, and store the energy, for providing power for other electronic devices.

It has been pointed out above that the wireless charging device provided by the embodiments of the present disclosure may continuously adjust the transmitting power of the wireless transmitter circuit during the charging process in the first wireless charging mode, so that the output voltage and/or the output current of the wireless receiver circuit matches the charging voltage and/or charging current presently required by the battery. The manner of adjusting the transmitting power of the wireless transmitter circuit is not specifically limited in the embodiments of the present disclosure.

In an embodiment, the wireless charging device may perform communication with the power supply device to adjust the output voltage and/or output current of the power supply device, thereby adjusting the transmitting power of the wireless transmitter circuit. Adjusting the transmitting power of the wireless transmitter circuit is controlled by the power supply device, which adjusts the transmitting power of the wireless transmitter circuit by changing the output voltage and/or the output current. This way of adjusting the transmitting power is advantageous in that, the power supply device may provide as much power as the wireless charging device needs, thus avoiding waste of power.

In another embodiment, the wireless charging device may adjust a power quantity drawn by the wireless transmitter circuit from the maximum output power provided by the power supply device, thereby adjusting the transmitting power of the wireless transmitter circuit. In other words, in embodiments of the present disclosure, adjusting the transmitting power of the wireless transmitter circuit is controlled by the wireless charging device, and the wireless charging device adjusts the transmitting power of the wireless transmitter circuit immediately once receiving the feedback information of the device to be charged, which has the advantages of fast adjustment speed and high efficiency.

In the second wireless charging mode, in an embodiment, the power supply device may be a power supply device with a fixed maximum output power, and the wireless charging device does not adjust the power output by the power supply device, and charges the device to be charged with the fixed transmitting power. For example, the power supply device may output a fixed power of 5 W, so that the wireless charging device performs wireless charging on the device to be charged with the fixed power of 5 W. In another embodiment, the power supply device may also output a maximum output power greater than 5 W, and the wireless charging device converts the maximum output power provided by the power supply device to the fixed 5 W, to perform wireless charging on the device to be charged. Regardless of whether the wireless charging device adjusts the maximum output power output by the power supply device, the maximum output power of the power supply device is less than the preset value in the second wireless charging mode.

In some embodiments, after the wireless charging device detects the device to be charged, the wireless charging device may first charge the device to be charged in the second wireless charging mode. In other words, the wireless charging device may first provide standard wireless charging voltage and current (e.g., 5 W of the QI standard) to the device to be charged. After identifying the type of power supply device, the wireless charging device then provides the wireless charging voltage and current to the device to be charged in a wireless charging mode corresponding to the type of power supply device.

In embodiments of the present disclosure, a communication mode between the wireless charging device and the power supply device is not limited. As an example, the wireless charging device may be coupled to a power supply device via a communication interface other than the charging interface, and may perform communication with the power supply device via the communication interface. As another example, the wireless charging device may perform near field communication (NFC) with the power supply device in a wireless manner. As still another example, the wireless charging device may perform communication with the power supply device via the charging interface without setting an additional communication interface. For example, the charging interface may be a USB interface, and the wireless charging device may perform communication with the power supply device via data wires (such as D+ and/D− wires) in the USB interface. Specifically, the wireless charging device may identify the type of the power supply device through the data wires in the USB interface. For another example, the charging interface may be a USB interface (such as a USB TYPE-C interface) that supports a power delivery (PD) communication protocol, and the wireless charging device may perform communication with the power supply device based on the PD communication protocol.

It should be understood that the type of the power supply device is not specifically limited in the embodiments of the present disclosure. For example, the power supply device may be an adapter, a power bank, a car charger, or a computer. Specifically, the types of the power supply devices may include two classifications, one may correspond to the first wireless charging mode, and the other may correspond to the second wireless charging mode. For example, the type of the power supply device corresponding to the first wireless charging mode may be a fast charging adapter (the maximum output power provided by which is greater than or equal to the preset value), and the type of the power supply device corresponding to the second wireless charging mode may be a standard adapter or a USB interface (the maximum output power provided by which is less than the preset value).

It should be understood that the output current of the power supply device may be constant direct current, pulsating direct current or alternating current, which is not specifically limited in the embodiments of the present disclosure.

It is to be understood that the example of FIG. 2 is intended to assist those skilled in the art to understand the embodiments of the present disclosure, and not to limit the embodiments of the present disclosure to the specific scenarios illustrated. Obviously, a person skilled in the art may make various equivalent modifications or changes according to the example of FIG. 2, and such modifications or variations also fall within the scope of the embodiments of the present disclosure.

Figure 6:
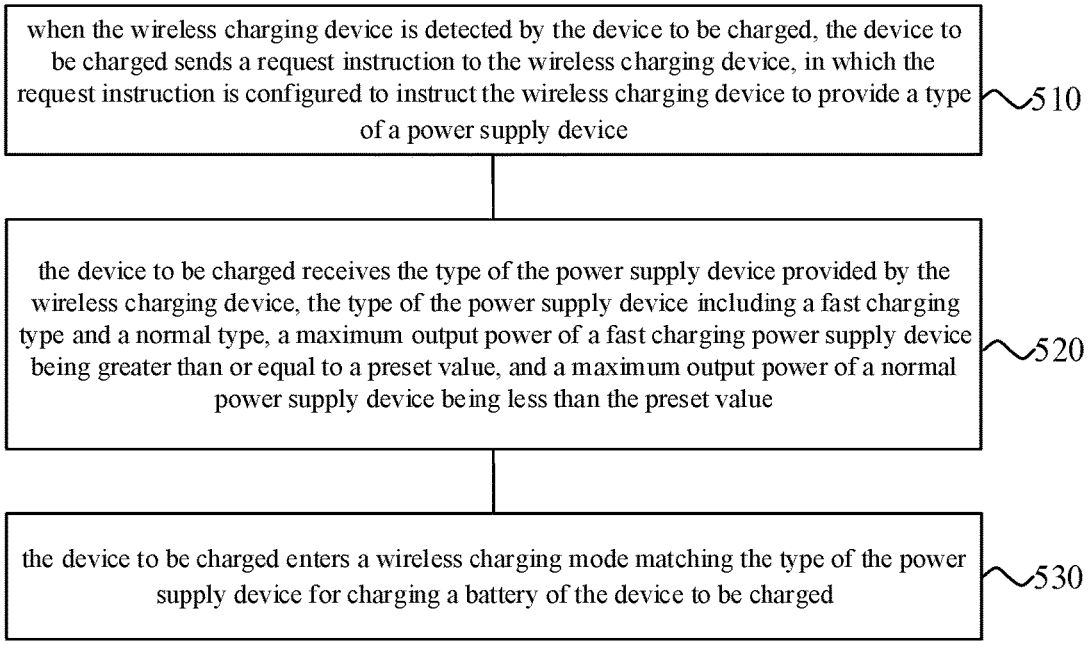
FIG. 6 is a flowchart of a wireless charging method according to another embodiment of the present disclosure.

A wireless charging method 500 of another embodiment of the present disclosure will be described below with reference to FIG. 6. As illustrated in FIG. 6, the method 500 may be performed by a device to be charged (such as the device to be charged in FIG. 5). The device to be charged may be, for example, a terminal, and the method 500 may include some or all of the following contents.

At S510, when the wireless charging device is detected by the device to be charged, the device to be charged sends a request instruction to the wireless charging device, in which the request instruction is configured to instruct the wireless charging device to provide a type of a power supply device.

At S520, the device to be charged receives the type of the power supply device provided by the wireless charging device, the type of the power supply device including a fast charging type and a normal type, a maximum output power of a fast charging power supply device being greater than or equal to a preset value, and a maximum output power of a normal power supply device being less than the preset value.

At S530, the device to be charged enters a wireless charging mode matching the type of the power supply device for charging a battery of the device to be charged.

Therefore, in the wireless charging method provided by embodiments of the present disclosure, the wireless charging device is requested to provide the type of the power supply device, such that the device to be charged may enter the corresponding wireless charging mode according to the type of the power supply device, making the wireless charging more flexible and improving the user experience.

In embodiments of the present disclosure, the method further includes: the wireless charging device identifying the type of the power supply device before receiving the request instruction.

In embodiments of the present disclosure, the wireless charging device sending the type of the power supply device identified by the wireless charging device according to the request instruction, includes: the wireless charging device identifying the type of the power supply device according to the request instruction, and sending the type of the power supply device to the device to be charged.

In embodiments of the present disclosure, the method further includes: the wireless charging device charging a battery of the device to be charged in a first wireless charging mode when the power supply device is the fast charging power supply device; and the wireless charging device charging a battery of the device to be charged in a second wireless charging mode when the power supply device is the normal power supply device, in which a charging speed of the wireless charging device charging the battery in the first wireless charging mode is greater than a charging speed of the wireless charging device charging the battery in the second wireless charging mode.

In embodiments of the present disclosure, the first wireless charging mode is a wireless charging mode in which the output power of the wireless charging device is variable; the second wireless charging mode is a wireless charging mode in which the output power of the wireless charging device is fixed.

In embodiments of the present disclosure, in the first wireless charging mode, the power of the electromagnetic signal transmitted by the wireless charging device matches the charging voltage and/or charging current presently required by the battery.

In embodiments of the present disclosure, the power supply device is an adapter, a power bank, or a computer.

In embodiments of the present disclosure, the wireless charging device performs wireless communication with the device to be charged based on Bluetooth, wireless fidelity or backscatter modulation.

It should be understood that the interaction between the device to be charged and the wireless charging device and related characteristics, functions, and the like correspond to the related characteristics and functions of the wireless charging device. In other words, the wireless charging device sends an instruction to the device to be charged, and the device to be charged receives the instruction from the wireless charging device. The related content has been described in detail in the above method 300, and for brevity, no further details are provided here.

The wireless charging device and the device to be charged according to embodiments of the present disclosure are described in detail below with reference to FIG. 7 and FIG. 8. It should be understood that the wireless charging device and the device to be charged described in the context of device side correspond to that in the context of method side, and for brevity, repeated description is omitted herein.

Figure 7:
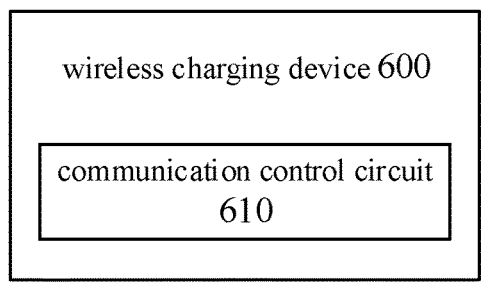
FIG. 7 is a block diagram of a wireless charging device according to an embodiment of the present disclosure.

FIG. 7 is a block diagram of a wireless charging device according to an embodiment of the present disclosure. As illustrated in FIG. 7, the wireless charging device 600 provided by the embodiments of the present disclosure may include a communication control circuit 610.

The communication control circuit 610 is configured to receive a request instruction sent by a device to be charged, the request instruction being configured to request the wireless charging device to provide a type of a power supply device to the device to be charged; and to send the type of the power supply device identified by the wireless charging device to the device to be charged according to the request instruction, the type of the power supply device including a fast charging type and a normal type, a maximum output power provided by a fast charging power supply device being greater than or equal to a preset value, and a maximum output power provided by a normal power supply device being less than the preset value.

In an embodiment, the communication control circuit is further configured to identify the type of the power supply device before receiving the request instruction.

In an embodiment, the communication control circuit is specifically configured to identify the type of the power supply device according to the request instruction, and send the type of the power supply device to the device to be charged.

In some embodiments, the wireless charging device 600 may further include a wireless transmitter circuit. The wireless transmitter circuit is configured to, when the power supply device is the fast charging power supply device, transmit an electromagnetic signal in the first wireless charging mode to charge the battery, or when the power supply device is the normal power supply device, transmit the electromagnetic signal in the second wireless charging mode to charge the battery. The charging speed of the wireless charging device charging the battery in the first wireless charging mode is greater than the charging speed of the wireless charging device charging the battery in the second wireless charging mode.

In some embodiments, the wireless charging device 600 further includes a wireless transmitter circuit and a voltage conversion circuit. The voltage conversion circuit is configured to, when the power supply device is the fast charging power supply device, perform step-down process on an output voltage of the power supply device, to enable the wireless transmitter circuit to transmit the electromagnetic signal in the second wireless charging mode to charge the battery of the device to be charged; or when the power supply device is the normal power supply device, perform boost process on the output voltage of the power supply device, to enable the wireless transmitter circuit to transmit the electromagnetic signal in the first wireless charging mode to charge the battery of the device to be charged. The charging speed of the wireless charging device charging the battery in the first wireless charging mode is greater than the charging speed of the wireless charging device charging the battery in the second wireless charging mode.

In some embodiments, the wireless transmitter circuit may include a wireless transmission driver circuit, and a transmitting coil or transmitting antenna. The wireless transmission driver circuit may be configured to generate higher frequency alternating current, and the transmitting coil or transmitting antenna may be configured to convert the higher frequency alternating current into electromagnetic signals for transmission.

In an embodiment, the first wireless charging mode is a wireless charging mode in which the output power of the wireless charging device is variable; and the second wireless charging mode is a wireless charging mode in which the output power of the wireless charging device is fixed.

In an embodiment, in the first wireless charging mode, the power of the electromagnetic signal transmitted by the wireless transmitter circuit matches the charging voltage and/or charging current presently required by the battery.

In an embodiment, the wireless transmitter circuit is further configured to transmit the electromagnetic signal in the second wireless charging mode to charge the battery of the device to be charged, before the communication control circuit identifies the type of the power supply device.

In an embodiment, the wireless charging device is coupled to the power supply device via a serial bus USB interface. The communication control circuit 610 is specifically configured to identify the type of the power supply device via data wires of the USB interface.

In an embodiment, the power supply device is an adapter, a power bank, or a computer.

In an embodiment, the wireless charging device performs wireless communication with the device to be charged based on Bluetooth, wireless fidelity or backscatter modulation.

Figure 8:
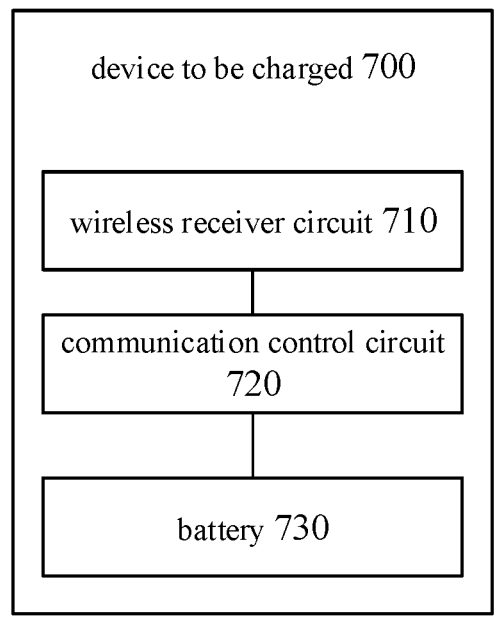
FIG. 8 is another block diagram of a device to be charged according to an embodiment of the present disclosure.

FIG. 8 is a block diagram of a device to be charged according to an embodiment of the present disclosure. As illustrated in FIG. 8, the device to be charged 700 provided by the embodiments of the present disclosure may include a wireless receiver circuit 710, a communication control circuit 720, and a battery 730.

The communication control circuit 720 is configured to send a request instruction to a wireless charging device, the request instruction being configured to instruct the wireless charging device to provide a type of a power supply device, and to receive the type of the power supply device coupled to the wireless charging device provided by the wireless charging device. The type of the power supply device includes a fast charging type and a normal type, a maximum output power provided by a fast charging power supply device is greater than or equal to a preset value, and a maximum output power provided by a normal power supply device is less than the preset value.

The wireless receiver circuit 710 is configured to receive an electromagnetic signal transmitted by the wireless charging device in a wireless charging mode matching the type of the power supply device, and to convert the electromagnetic signal to an output voltage and an output current of the wireless receiver circuit for charging the battery.

In an embodiment, the wireless receiver circuit 710 is specifically configured to: when the power supply device is the fast charging power supply device, receive the electromagnetic signal transmitted by the wireless charging device in a first wireless charging mode, and convert the electromagnetic signal to the output voltage and the output current of the wireless receiver circuit for charging the battery; and when the power supply device is the normal power supply device, receive the electromagnetic signal transmitted by the wireless charging device in a second wireless charging mode, and convert the electromagnetic signal to the output voltage and the output current of the wireless receiver circuit for charging the battery. The charging speed of the battery in the first wireless charging mode is greater than the charging speed of the battery in the second wireless charging mode.

In an embodiment, the first wireless charging mode is a wireless charging mode in which the output power of the wireless charging device is variable; and the second wireless charging mode is a wireless charging mode in which the output power of the wireless charging device is fixed.

In an embodiment, in the first wireless charging mode, the power of the electromagnetic signal transmitted by the wireless charging device matches the charging voltage and/or charging current presently required by the battery.

In embodiments of the present disclosure, the power supply device is an adapter, a power bank, or a computer.

In an embodiment, the wireless charging device performs wireless communication with the device to be charged based on Bluetooth, wireless fidelity or backscatter modulation.

It should be understood that the circuit structure and the working principle of the wireless charging device 600 and the device to be charged 700 provided by the embodiments of the present disclosure correspond to the wireless charging device and the device to be charged described in the wireless charging method 300 provided by the embodiments of the present disclosure, and for brevity, the details will not be elaborated here.

Figure 9:
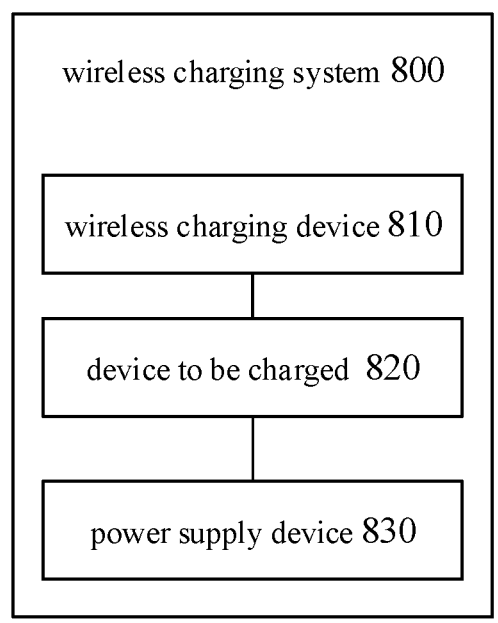
FIG. 9 is a block diagram of a wireless charging system according to an embodiment of the present disclosure.

Embodiments of the present disclosure also provide a wireless charging system. As illustrated in FIG. 9, the wireless charging system 800 may include a wireless charging device 810, a device to be charged 820, and a power supply device 830. The wireless charging device 810 may correspond to the wireless charging device 600, and the device to be charged 820 may correspond to the device to be charged 700.

Those skilled in the art may appreciate that the elements and algorithm steps of the various examples described in connection with the embodiments disclosed herein may be implemented in electronic hardware or a combination of computer software and electronic hardware. Whether these functions are executed in hardware or software depends on the specific application and design constraints of the solution. A person skilled in the art may use different methods to implement the described functions for each particular application, but such implementation should not be considered to be beyond the scope of the present application.

A person skilled in the art may clearly understand that for the convenience and brevity of the description, the specific working process of the system, the device and the unit described above refer to the corresponding process in the foregoing method embodiment, and details are not described herein again.

In several embodiments provided by the present disclosure, it should be understood that, the system, devices and method disclosed in several embodiments provided by the present disclosure may be realized in any other manner. For example, the device embodiments described above may be merely examples, for example, the units are just divided according to logic functions. In practical implementation, the units may be divided in other manners, for example, multiple units or components may be combined or integrated into another system, or some features may be omitted or not executed. In addition, the mutual coupling or direct coupling or communication connection described or discussed may be implemented via some interfaces, and indirect coupling or communication connection between devices or units may be electrical, mechanical or of other forms.

The apparatus and devices mentioned in the present disclosure may each be a chip system or an apparatus or device having a housing.

The units illustrated as separate components may be or not be separated physically, and components described as units may be or not be physical units, i.e., may be located at one place, or may be distributed onto multiple network units. It is possible to select some or all of the units according to actual needs, for realizing the objective of embodiments of the present disclosure In addition, respective functional units in respective embodiments of the present disclosure may be integrated into one processing unit, or may be present as separate physical entities. It is also possible that two or more than two units are integrated into one unit.

If the functions are realized in form of functional software units and are sold or used as separate products, they may be stored in a computer readable storage medium. Based on this understanding, the parts of the technical solutions or the essential parts of the technical solutions (i.e. the parts making a contribution to the related art) may be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

Although explanatory embodiments have been shown and described, it would be appreciated by those skilled in the art that the above embodiments cannot be construed to limit the present disclosure, and changes, alternatives, and modifications may be made in the embodiments without departing from scope of the present disclosure.

What is claimed is:

1. A method for wireless charging, comprising:
   a wireless charging device receiving a request instruction sent by a device to be charged, the request instruction being configured to request the wireless charging device to provide a type of a power supply device to the device to be charged; and
   the wireless charging device sending the type of the power supply device identified by the wireless charging device to the device to be charged according to the request instruction, the type of the power supply device comprising a fast charging type and a normal type, a maximum output power provided by a fast charging power supply device being greater than or equal to a preset value, and a maximum output power provided by a normal power supply device being less than the preset value;
   wherein a charging speed of the wireless charging device charging a battery in a first wireless charging mode is greater than a charging speed of the wireless charging device charging the battery in a second wireless charging mode; and
   when the power supply device is the fast charging power supply device, the wireless charging device performing step-down process on an output voltage of the power supply device to enable the wireless charging device to charge the battery of the device to be charged in the second wireless charging mode; or when the power supply device is the normal power supply device, the wireless charging device performing boost process on the output voltage of the power supply device to enable the wireless charging device to charge the battery of the device to be charged in the first wireless charging mode.

2. The method according to claim 1, further comprising:
   the wireless charging device identifying the type of the power supply device before receiving the request instruction.

3. The method according to claim 1, wherein the wireless charging device sending the type of the power supply device identified by the wireless charging device to the device to be charged according to the request instruction comprises:
   the wireless charging device identifying the type of the power supply device according to the request instruction and sending the type of the power supply device to the device to be charged.

4. The method according to claim 1, further comprising:
   the wireless charging device charging a battery of the device to be charged in a first wireless charging mode when the power supply device is the fast charging power supply device; and
   the wireless charging device charging the battery of the device to be charged in a second wireless charging mode when the power supply device is the normal power supply device;
   wherein a charging speed of the wireless charging device charging the battery in the first wireless charging mode is greater than a charging speed of the wireless charging device charging the battery in the second wireless charging mode.

5. The method according to claim 4, wherein the first wireless charging mode is a wireless charging mode in which an output power of the wireless charging device is variable, and the second wireless charging mode is a wireless charging mode in which the output power of the wireless charging device is fixed.

6. The method according to claim 4, wherein in the first wireless charging mode, a power of an electromagnetic signal transmitted by the wireless charging device matches at least one of a charging voltage or a charging current presently required by the battery.

7. The method according to claim 4, further comprising:
   before the wireless charging device identifies the type of the power supply device, the wireless charging device charging the battery in the second wireless charging mode.

8. The method according to claim 2, wherein the wireless charging device is coupled to the power supply device via a universal serial bus USB interface, and the wireless charging device identifies the type of the power supply device by:
the wireless charging device identifying the type of the power supply device via data wires of the USB interface.

9. The method according to claim 1, wherein the wireless charging device performs wireless communication with the device to be charged based on Bluetooth, WiFi, or backscatter modulation.

10. A method for wireless charging, comprising:
a device to be charged sending a request instruction to a wireless charging device when the wireless charging device is detected by the device to be charged, the request instruction being configured to instruct the wireless charging device to provide a type of a power supply device;
the device to be charged receiving the type of the power supply device provided by the wireless charging device, the type of the power supply device comprising a fast charging type and a normal type, a maximum output power of a fast charging power supply device being greater than or equal to a preset value, and a maximum output power of a normal power supply device being less than the preset value; and
the device to be charged entering a wireless charging mode matching the type of the power supply device for charging a battery of the device to be charged, comprising:
the device to be charged entering a second wireless charging mode for charging the battery when the power supply device is the fast charging power supply device, and a step-down process is performed on an output voltage of the power supply device to enable charging the battery of the device to be charged in a second wireless charging mode; and
the device to be charged entering a first wireless charging mode for charging the battery when the power supply device is the normal power supply device, and boost process is performed on an output voltage of the power supply device to enable charging the battery of the device to be charged in a first wireless charging mode;
wherein a charging speed of the battery in the first wireless charging mode is greater than a charging speed of the battery in the second wireless charging mode.

11. The method according to claim 10, wherein the device to be charged entering a wireless charging mode matching the type of the power supply device for charging the battery of the device to be charged comprises:
the device to be charged entering a first wireless charging mode for charging the battery, when the power supply device is the fast charging power supply device; and
the device to be charged entering a second wireless charging mode for charging the battery, when the power supply device is the normal power supply device;
wherein a charging speed of the battery in the first wireless charging mode is greater than a charging speed of the battery in the second wireless charging mode.

12. A wireless charging device, comprising:
a communication control circuit, configured to receive a request instruction sent by a device to be charged, the request instruction being configured to request the wireless charging device to provide a type of a power supply device to the device to be charged; and to send the type of the power supply device identified by the wireless charging device to the device to be charged according to the request instruction, the type of the power supply device comprising a fast charging type and a normal type, a maximum output power provided by a fast charging power supply device being greater than or equal to a preset value, and a maximum output power provided by a normal power supply device being less than the preset value;
a wireless transmitter circuit; and
a voltage conversion circuit configured to:
when the power supply device is the fast charging power supply device, perform step-down process on an output voltage of the power supply device to enable the wireless transmitter circuit to transmit an electromagnetic signal in a second wireless charging mode to charge a battery of the device to be charged; or
when the power supply device is the normal power supply device, perform boost process on the output voltage of the power supply device to enable the wireless transmitter circuit to transmit an electromagnetic signal in the first wireless charging mode to charge the battery,
wherein a charging speed of the wireless charging device charging the battery in the first wireless charging mode is greater than a charging speed of the wireless charging device charging the battery in the second wireless charging mode.

13. The wireless charging device according to claim 12, wherein the communication control circuit is further configured to:
identify the type of the power supply device before receiving the request instruction.

14. The wireless charging device according to claim 12, wherein the communication control circuit is configured to:
identify the type of the power supply device according to the request instruction and send the type of the power supply device to the device to be charged.

15. The wireless charging device according to claim 12, further comprising:
a wireless transmitter circuit, configured to transmit an electromagnetic signal in a first wireless charging mode to charge a battery when the power supply device is the fast charging power supply device, or, to transmit an electromagnetic signal in a second wireless charging mode to charge the battery when the power supply device is the normal power supply device;
wherein a charging speed of the wireless charging device charging the battery in the first wireless charging mode is greater than a charging speed of the wireless charging device charging the battery in the second wireless charging mode.

16. The wireless charging device according to claim 15, wherein the first wireless charging mode is a wireless charging mode in which an output power of the wireless charging device is variable; and the second wireless charging mode is a wireless charging mode in which the output power of the wireless charging device is fixed.

17. The wireless charging device according to claim 15, wherein the wireless transmitter circuit is further configured to:
transmit the electromagnetic signal in the second wireless charging mode to charge the battery of the device to be charged before the communication control circuit identifies the type of the power supply device.

18. The wireless charging device according to claim 12, wherein the wireless charging device is coupled to the power supply device via a universal serial bus USB interface, and the communication control circuit is configured to:
　identify the type of the power supply device via data wires of the USB interface.

\* \* \* \* \*